United States Patent
Kaaden et al.

[11] Patent Number: 5,978,188
[45] Date of Patent: Nov. 2, 1999

[54] MULTITRACK TAPE DEVICE USING A MOVABLE MAGNETIC HEAD WITH A PLANAR SURFACE AND INCLUDING A TAPE SUPPORTING DEVICE

[75] Inventors: Jürgen Kaaden; Klaus Oldermann, both of Villingen-Schwenningen, Germany

[73] Assignee: Deutsche Thomson-Brandt, Hanover, Germany

[21] Appl. No.: 09/011,763

[22] PCT Filed: Jun. 23, 1997

[86] PCT No.: PCT/EP97/03285

§ 371 Date: Mar. 30, 1998

§ 102(e) Date: Mar. 30, 1998

[87] PCT Pub. No.: WO98/00838

PCT Pub. Date: Jan. 8, 1998

[30] Foreign Application Priority Data

Jun. 28, 1996 [EP] European Pat. Off. .............. 96401433

[51] Int. Cl.⁶ ................................ G11B 5/29; G11B 5/55
[52] U.S. Cl. .................... 360/130.32; 360/106; 360/134; 360/121
[58] Field of Search ................................ 360/77.12, 106, 360/130.3, 130.31, 130.32, 121, 134

[56] References Cited

U.S. PATENT DOCUMENTS

| | | | |
|---|---|---|---|
| 5,371,638 | 12/1994 | Saliba | 360/77.12 |
| 5,452,152 | 9/1995 | Rudi | 360/77.12 |
| 5,592,351 | 1/1997 | Carter | 360/106 |
| 5,675,448 | 10/1997 | Molstad et al. | 360/77.12 |
| 5,706,149 | 1/1998 | Hoelsaeter | 360/106 |
| 5,812,347 | 9/1998 | Henke | 360/106 |
| 5,818,668 | 10/1998 | Gonzales | 360/106 |

FOREIGN PATENT DOCUMENTS

| | | |
|---|---|---|
| 379324 | 7/1990 | European Pat. Off. . |
| 3635536 | 4/1988 | Germany . |
| 9212496 | 11/1992 | Germany . |

OTHER PUBLICATIONS

IBM Technical Disclosure Bulletin; vol. 26, No. 9; Guzman et al; "Head Mount" Feb. 1984.

Texier et al; XP000605652; Proceedings of the Second International Symposium on Magnetic Materials, Processes, and Devices; "Head to Tape Contact Characterization for a Fixed Multi–Track Magnetic Head" Oct. 1992.

IBM Technical Disclosure Bulletin; vol. 32, No. 3B; "Compliant Tape Guiding Embedded in an Indexed Head" Aug. 1989.

*Primary Examiner*—Jefferson Evans
*Attorney, Agent, or Firm*—Oblon, Spivak, McClelland, Maier & Neustdt, P.C.

[57] ABSTRACT

A tape recorder and/or a playback device for a multitrack tape utilizes a magnetic head having active parts for recording and/or reading microtracks with the active parts being arranged in a two-dimensional matrix within a substantially planar surface of the magnetic head. A pressure device assures contact between the microtracks and the active parts by acting on a backside surface of the tape opposite to the front side surface containing the magnetic head. A structure allows for positioning the magnetic head in front of either one of at least two macrotracks which bundle addressed microtracks. A portion of the tape surface is supported adjacent to the macrotrack bundling the addressed microtracks to prevent unwanted tape deformation.

20 Claims, 4 Drawing Sheets

MULTITRACK TAPE DEVICE USING A MOVABLE MAGNETIC HEAD WITH A PLANAR SURFACE AND INCLUDING A TAPE SUPPORTING DEVICE

BACKGROUND OF THE INVENTION

The invention relates to a tape recorder and/or playback device for recording and/or reading on a multitrack tape.

In devices of the above mentioned type it is known to use a magnetic head to write and/or read tracks on a multitrack magnetic tape. A track is called a macrotrack when it bundles a plurality of smaller elementary microtracks. A magnetic head may comprise a plurality of active parts, each part being used to write and/or read in one microtrack at the time and the number of active parts being large enough to write in all the microtracks of a macrotrack simultaneously. An example for a device of the above mentioned type is a SDVCR (Stationary Digital Video Cassette Recorder) in which a stationary magnetic head is used to address all the microtracks over the whole width of the tape simultaneously (Reference 1: High-Data-Rate, High-Density Magnetic Tape Recorder Using Matrix Writing Head and Kerr Reading Head, J. C. Lehureau and J-P. Castera, THOMSON-CSF Central research Lab, Orsay, Proceedings of the 13th IEEE Symposium on Mass Storage Systems, Annecy, France, Jun. 12–16, 1994, pp127–130). The active parts of a SDVCR magnetic head are usually arranged in a two-dimensional matrix within a surface of the magnetic head. The surface containing the matrix of active parts is typically obtained by polishing a multi-layer structure until the active parts and their magnetic gaps appear on the surface. Surfaces obtained by this method are substantially planar, therefore a problem occurs when one tries to bring in contact all the active parts of the matrix with their corresponding microtracks at the tape surface. The tape which is very thin by nature will tend to loose contact above the relatively large and planar surface containing the matrix of active parts of the magnetic head. To assure the contact between the microtracks and the active parts an airflow system flattens the tape against the planar surface (Reference 2: Head to Tape Contact Characterization for a 384 Tracks Fixed Magnetic Head, F. Le Texier, N. Blanchard, J-M. Coutellier, THOMSON-CSF, Electrochemical Society Fall Meeting 91, Phoenix, U.S.A.).

The SDVCR magnetic head is typically designed to address a relatively large number of microtracks simultaneously, e.g. 1024 tracks. The complex technology used to produce the SDVCR magnetic head may cause relatively high production costs. In addition the volume needed to incorporate an airflow system turns out to have drawbacks, specially when integrating it in a compact and perhaps portable SDVCR.

SUMMARY OF THE INVENTION

The first problem solved by the present invention is to find a solution for a device of the above mentioned type in which a cheaper magnetic head can be used to write and/or read the microtracks. Additionally a compact and more simple solution for means to assure an intimate contact everywhere between the microtracks and the active parts of the magnetic head is suggested.

The above raised problem is solved by the present invention which consists of a magnetic tape recorder and/or playback device for recording and/or reading on a magnetic tape having a magnetic layer at a front side surface on which a plurality of information microtracks which are parallel to a direction of transportation of the tape may be recorded, said device comprising at least a magnetic head having active parts for recording and/or reading microtracks, the active parts being arranged in a two-dimensional matrix within a substantially planar surface of the magnetic head in a way that a microtrack is addressed respectively by one dedicated active part of said matrix, means for transporting the tape in front of the active parts of the magnetic head, and pressure means assuring contact between the microtracks and said active parts by acting on a back side surface of the tape opposite to the front side surface of the tape, in which said device comprises means for moving the magnetic head in a direction secant to the direction of the microtracks in order to position said active parts in front of addressed microtracks bundled in either one of at least two macrotracks, and means for supporting a portion of the tape surface carrying macrotracks which are adjacent to the macrotrack bundling said addressed microtracks to prevent unwanted tape deformation, said means for supporting being distinct from the magnetic head. The device according to the present invention may use a magnetic head with fewer active parts than the magnetic head known from the prior art. For this reason the device according to the invention may also be cheaper to produce. The device according to the invention can be used to write and/or read a number of microtracks which is greater than the number of active parts contained on the magnetic head surface. This is achieved by moving the magnetic head in a direction secant to the direction of the microtracks, thus moving the active parts from one macrotrack to another one. A limited number of microtracks that can be addressed simultaneously using the active parts on the magnetic head surface are bundled in a macrotrack. Hence the number of active parts on the magnetic head can be used to define the number of macrotracks that will bundle the microtracks. The magnetic tape will carry at least 2 macrotracks across its width. The width of the magnetic head measured along a tapewidth direction is at least as large as the width of a macrotrack. During writing and/or reading in a macrotrack, the tape is pressed on the surface of the magnetic head using the pressure means. In some cases, this may lead to an irreversible tape deformation (deterioration) occurring at edges of the magnetic head. To prevent this deformation, the device according to the invention uses means for supporting the portion of the tape which is adjacent to and goes over the planar surface of the magnetic head containing the active parts.

In a further embodiment of the device according to the invention, the pressure means are mounted on a movable support which allows the pressure means to be disengaged from the tape, the pressure means thereby releasing pressure on the back side surface of the tape. The device according to the further embodiment has the advantage that the magnetic head may be moved more quickly in a direction secant to the direction of the macrotracks when the pressure means are disengaged from the tape. The risks of tearing or damaging the tape are greatly diminished this way.

In another embodiment of the device according to the invention, the means for supporting and the pressure means are the same means. This embodiment leads to a further simplification of the device and reduction of the production costs.

The device according to the invention may also have the means for supporting located on the front side surface of the tape. In this embodiment the means for supporting is mounted around the magnetic head and have the same movement as the magnetic head when the magnetic head is displaced in a direction secant to the direction of the microtracks. This embodiment of the device according to the invention allows the magnetic head to be moved relatively quickly without having to disengage the support means from the tape.

In an other preferred embodiment of the device according to the invention, the means for supporting comprises a plate which is located on the front side surface of the tape. This plate has a slanting opening in a direction secant to the direction of the macrotracks in which the magnetic head can slide to address different macrotracks. The pressure means is mounted on a support which allows it to be displaced in a way to assure said contact between the macrotracks and the active parts when the magnetic head is moved. In this embodiment, the magnetic head can be moved relatively quickly while the means for supporting does not have the same movement as the magnetic head but stays fixed. Furthermore, this embodiment is very compact and may be used to realize a compact and portable device according to the invention.

In a still further preferred embodiment of the device according to the invention, the pressure means comprises a pressure pad which is made of an elastic medium and a surface of which is used to press on the back side surface of the tape. This is a simple way to achieve the pressure means. In a more sophisticated embodiment of the device according to the invention, the pressure means comprises a pressure roller which is made of an elastic medium and is mounted on an axis perpendicular to the direction of the microtracks, a surface of the pressure roller being used to press on the back side surface of the tape. This way the friction on the back side surface of the tape is reduced.

In an advantageous embodiment of the device according to the invention the active parts of the magnetic head are used for writing and the microtracks are read using an optical system associated to said magnetic head and comprising at least a polarized light source, a magneto-optical transducer and a linear optical sensor. This advantageous embodiment allows to write relatively narrow microtracks which may be read using the optical system at a very low tape transportation speed. Additionally a relatively high density of information on the tape is achieved.

BRIEF DESCRIPTION OF THE DRAWINGS

Other characteristics and advantages of the invention will appear from the following description of several examples, made with reference to the appended FIG. 1 to 9.

FIG. 2 schematically shows a part of a tape recorder and/or playback device comprising a magnetic head, a pressure means, and tape being written or read on.

DETAILED DESCRIPTION OF THE PREFERRED EMBODIMENTS

Figure 1:
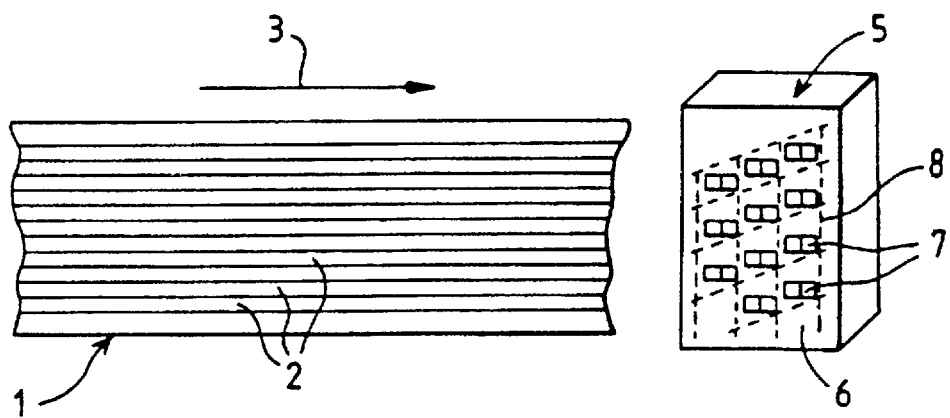
FIG. 1 contains a schematic representation of a portion of multitrack tape and a schematic view on a surface of a magnetic head containing a matrix of active parts.
Figure 2:
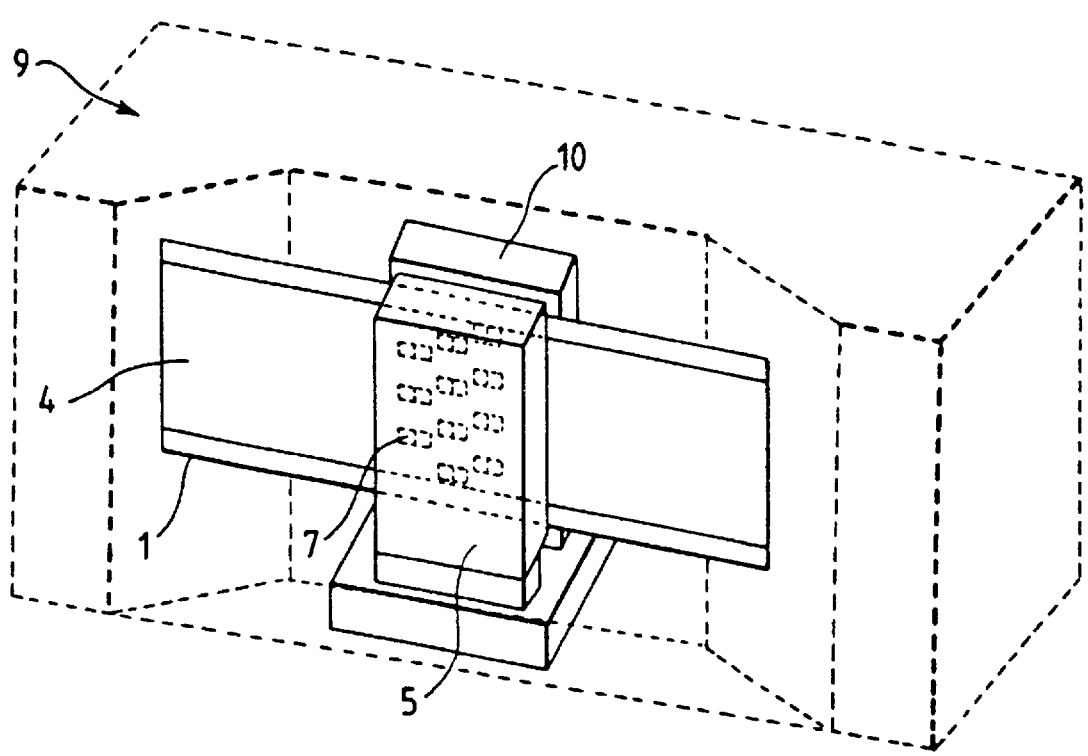

The examples and figures are given by way of illustration only, and thus are not limitative of the present invention. First a brief description will be given of a SDVCR type tape recorder device which is found in prior art as from reference 1. The portion of tape 1 shown in FIG. 1 carries on its front side surface a plurality of microtracks 2 in a direction parallel to a direction 3 of transportation of the tape 1. A magnetic head 5 used to write the microtracks 2 can also be seen in FIG. 1. A planar surface 6 of the magnetic head 5 comprises a plurality of active parts 7. Each active part 7 is used to address one microtrack 2. The active parts 7 are arranged in a two-dimensional matrix 8 which is represented by dotted lines for reasons of comprehension. To a microtrack 2 corresponds respectively one dedicated active part 7 in matrix 8. In FIG. 2, a part of a tape recorder and/or playback device 9 comprising the magnetic head 5, a pressure means 10 and a portion of tape 1 between them can be seen. The device 9 is represented in dotted lines and also comprises a means for transporting the tape, the reels on which the tape is wound and all the known mechanical and electronic devices (all not shown) needed to realize a tape recorder and/or playback device. The tape 1 is being transported in front the active parts 7 of the magnetic head 5 while pressure means 10 assure the contact between the microtracks 2 and the active parts 7. In the SDVCR the pressure means 10 typically comprises an airflow system (not shown) to create the pressure on a back side surface of the tape.

Figure 3:
FIG. 3 contains a schematic representation of a portion of tape carrying macrotracks and a schematic view of a magnetic head surface containing active parts.
Figure 4:
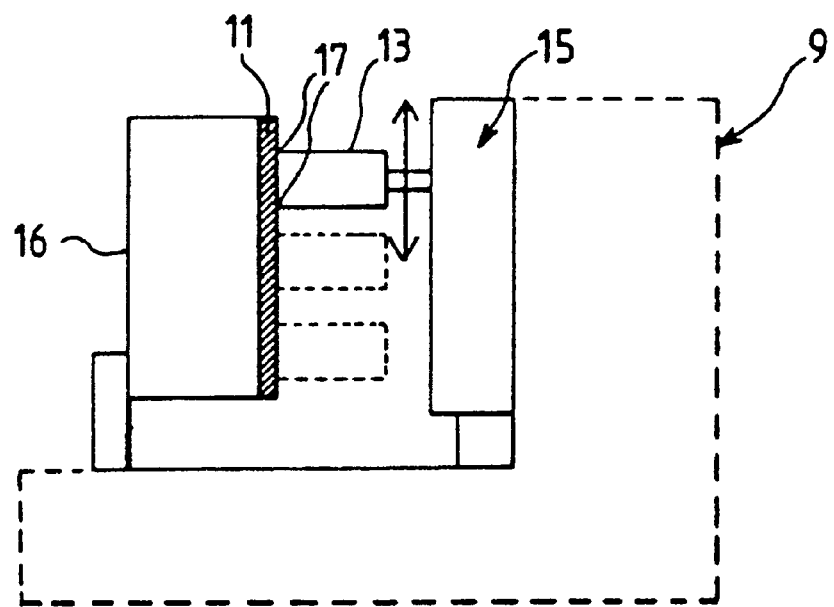
FIG. 4 shows a schematic representation of a movable magnetic head used to write and/or read macrotracks on tape.

For use in a device according to the invention, microtracks 2 may be bundled in at least two macrotracks 12 arranged on the tape 11 as shown in FIG. 3. Also shown in FIG. 3 is a simplified representation of a magnetic head 13 having a planar surface 14. The planar surface 14 comprises active parts 7 which are arranged in a matrix. The number of active parts 7 contained on the planar surface 14 of magnetic head 13 is typically smaller than the number of active parts used in magnetic head 5 of a SDVCR device as illustrated in FIG. 1 and 2. This renders magnetic head 13 cheaper to produce. The magnetic head 13 allows to read all the microtracks 2 of one macrotrack 12 at the time. As shown in FIG. 4, the magnetic head 13 may be positioned in front of either macrotrack 12 using means for moving 15. The means for moving 15 is part of the device 9 represented schematically using dotted lines. A pressure means 16 in the form of a pressure pad (or a pressure roller) made of an elastic medium is used to assure the contact between the microtracks 2 on tape 11 and the active parts 7 of the magnetic head 13. The pressure means 16 at the same time prevents the tape from bending or folding (and thus deteriorating) around edges 17 of the magnetic head 13. Said edges 17 delimit a zone of contact between the active parts 7 of the magnetic head 13 and the tape 11. Thus the pressure means 16 is also used as a means for supporting a portion of the tape. In this embodiment the means for supporting 16 which is also pressure means is located on a back side surface of the tape 11 opposite to a front side surface of the tape along which the magnetic head 13 is contacting. The portion of the tape to be supported is adjacent to a tape area containing the contacts between the active parts of magnetic head 13 and the microtracks they address. The means for supporting 16 is also part of the device 9.

Figure 5:
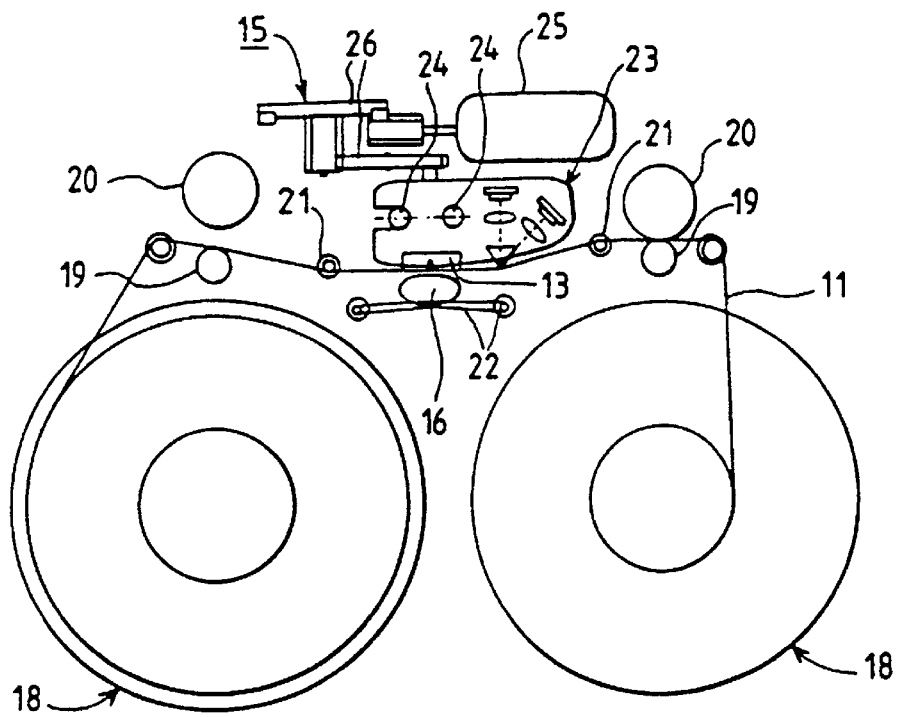
FIG. 5 gives a schematic overview of a device according to the invention.

FIG. 5 contains a schematic overall view of a device according to the invention. In the shown embodiment, the tape 11 is wound on and transported between two tape reels 18. The tape reels 18 may be used in conjunction with flanges and be driven using a clutch gear not shown. The tape transportation is achieved by rollers 19 and capstans 20. Tape guides 21 are used to keep the tape 11 on a precise path. The pressure means 16 may also be used as means for supporting, e.g. when pressure means are large enough to support the total tape width. The pressure means 16 are mounted on a movable support 22 which allows the pressure means 16 to be disengaged from the tape as in a position shown in the FIG. 5. The magnetic head 13 is fixed part of a larger Head Optical Unit (HOU) 23 which also comprises optical means for an optical read-out of the microtracks as known from the prior art (see reference 1). The optical means comprises at least a polarized light source, a Kerr head and a CCD sensor. The magnetic head 13 is moved in the same way as the HOU 23. The HOU 23 slides along bearings 24 the orientation of which is perpendicular to the direction of the microtracks and parallel to the tape surface. The means for moving 15 the HOU 23 comprise a motor 25 which drives a mechanical transmission 26 of a motor rotation to a movement of the HOU 23 along bearings 24.

Figures 6, 7:
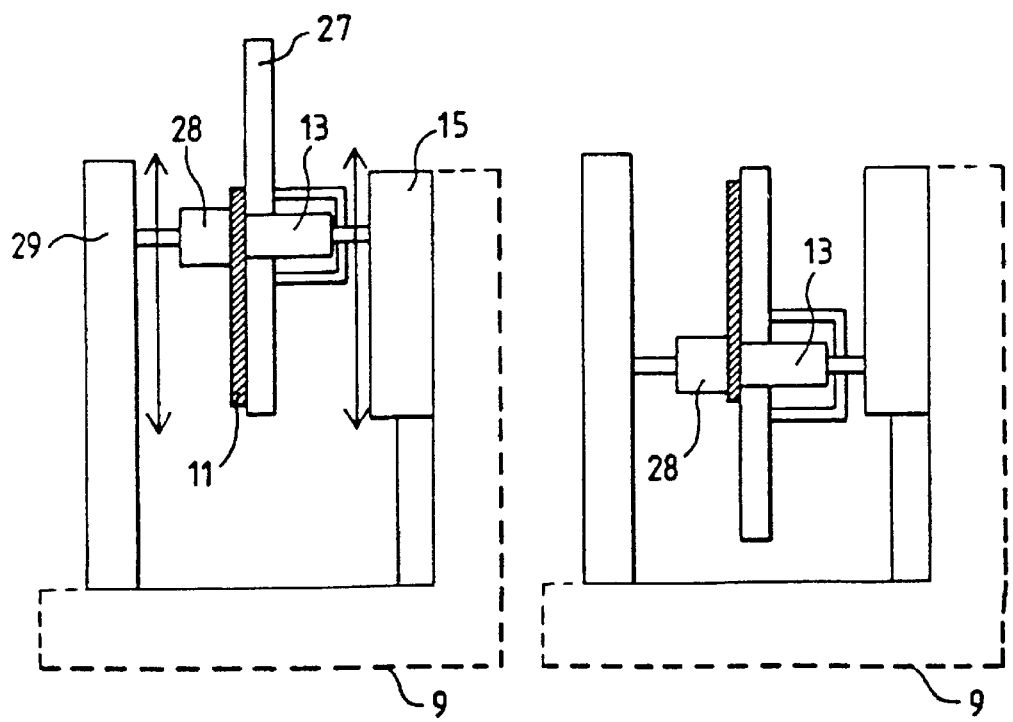
FIG. 6 contains a schematic representation of a magnetic head addressing a track on tape and around which are located means for supporting.
FIG. 7 contains a schematic representation of the same device as in FIG. 6 but with the magnetic head in a different position.

In an embodiment shown in FIG. 6, means for supporting 27 the tape 11 are mounted around the magnetic head 13. The means for supporting 27 are moved at the same time as the magnetic head 13 by the means for moving 15. A pressure means 28 presses on the back side surface of tape 11. The pressure means 28 can be moved by means 29 which are very similar to means for moving 15. The means for supporting 27 supports a portion of the tape surface which is adjacent to the magnetic head 13 but not in contact with the active parts of the magnetic head 13. FIG. 7 shows the same embodiment as in FIG. 6 but where the magnetic head 13 is positioned to read a different macrotrack as in FIG. 6. A tape height position measured relatively to device 9 stays unchanged in FIG. 6 and 7. Merely the magnetic head 13, the means for supporting 27 and the pressure means 28 are moved.

Figure 8:
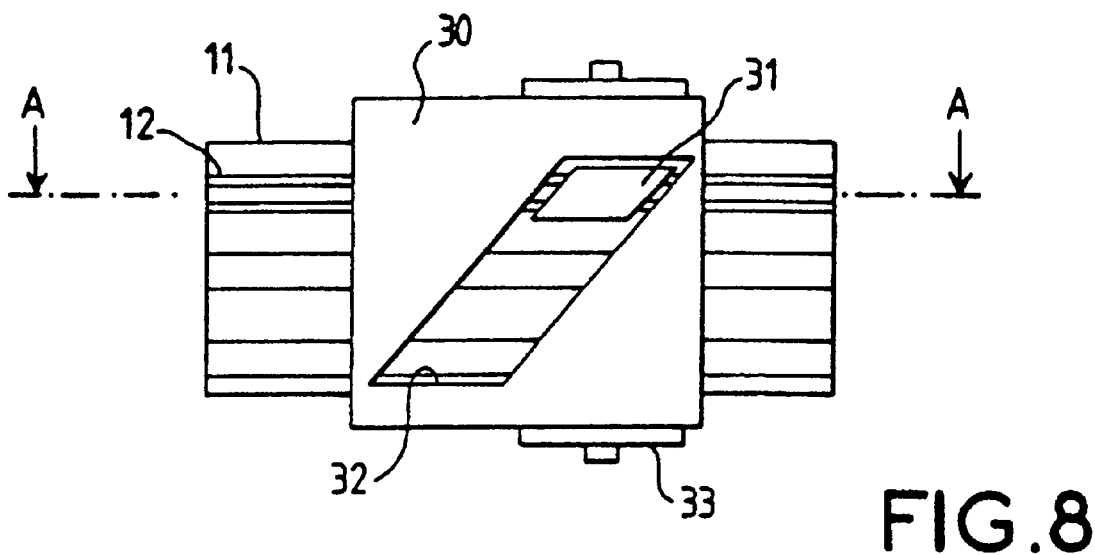
FIG. 8 shows a schematic view of a device using a plate as means for supporting.
Figure 9:
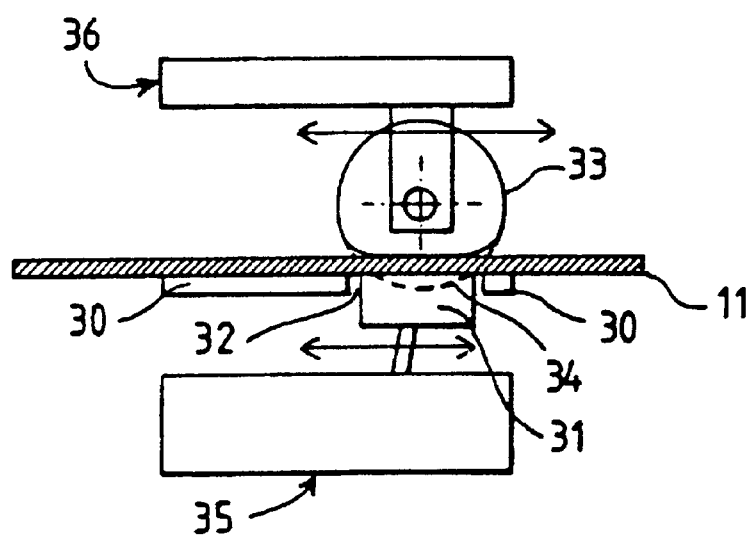
FIG. 9 shows a schematic sectional view through the line AA of FIG. 8.

In FIG. 8, a plate 30 located on the front side of the tape, i.e. the side a magnetic head 31 is on, supports the tape 11. The plate 30 has a slanting opening 32 in a direction secant to the direction of the macrotracks 12 and in which the magnetic head 31 slides to address microtracks of a macrotrack 12 on the tape 11. A pressure means 33 comprising a pressure roller made out of an elastic medium and an axis around which the roller rotates during tape transportation is used on the back side of the tape to assure the contact between microtracks and active parts of the magnetic head 31. The solution of the embodiment presented in FIG. 8 is more compact in a direction perpendicular to the microtracks as compared to the embodiment shown in FIG. 6 and 7. FIG. 9 shows a sectional view through the line AA of the device shown in FIG. 8. The pressure roller of pressure means 33 is shown in its compressed state, the initial uncompressed state of the roller being shown by a dotted line 34. The magnetic head 31 is slid by means for moving 35 in the slanting opening 32, the pressure roller of pressure means 33 is displaced by displacing means 36 in the direction parallel to the direction of the macrotracks so that said contact is assured at each position the magnetic head 31 may be set at.

We claim:

1. A tape recorder and/or playback device for recording and/or reading on a magnetic tape having a magnetic layer at a front side surface on which a plurality of information microtracks which are parallel to a direction of transportation of the tape may be recorded, said device comprising
   at least a magnetic head having active parts for recording and/or reading microtracks, the active parts being arranged in a two-dimensional matrix within a substantially planar surface of the magnetic head in a way that a microtrack is addressed respectively by one dedicated active part of said matrix,
   means for transporting the tape in front of the active parts of the magnetic head and
   pressure means assuring contact between the microtracks and said active parts by acting on a back side surface of the tape opposite to the front side surface of the tape,
   characterized in that said device comprises means for moving the magnetic head in a direction secant to the direction of the microtracks in order to position said active parts in front of addressed microtracks bundled in one of at least two macrotracks and, means for supporting a portion of the tape surface carrying one or more macrotracks which are adjacent to the macrotrack bundling said addressed microtracks to prevent unwanted tape deformation, said means for supporting being distinct from the magnetic head.

2. A tape recorder and/or playback device according to claim 1 characterized in that said pressure means are mounted on a movable support which allows said pressure means to be disengaged from the tape, said pressure means thereby releasing pressure on the back side surface of the tape.

3. A tape recorder and/or playback device according to claim 2 characterized in that said means for supporting and said pressure means are the same means.

4. A tape recorder and/or a playback device according to claim 2 characterized in that said means for supporting is located on the front side surface of the tape, is mounted around the magnetic head and has the same movement as the magnetic head when the magnetic head is displaced in said direction secant to the direction of the microtracks.

5. A tape recorder and/or playback device according to claim 2 characterized in that said means for supporting comprise a plate which is located on the front side surface of the tape, said plate having a slanting opening in a direction secant to the direction of the microtracks in which the magnetic head can slide to address different macrotracks, said pressure means being mounted on a displacing means which allows said pressure means to be displaced in a way to assure said contact between the microtracks and the active parts when the magnetic head is moved.

6. A tape recorder and/or playback device according to claim 2, characterized in that said pressure means comprises a pressure pad which is made of an elastic medium and a surface of which is used to press on said back side surface of the tape.

7. A tape recorder and/or playback device according to claim 2, characterized in that said pressure means comprises a pressure roller which is made of an elastic medium and is mounted on an axis perpendicular to the direction of the microtracks, a surface of the pressure roller being used to press on the back side surface of the tape.

8. A tape recorder and/or playback device according to claim 2, characterized in that said active parts of the magnetic head are used for writing only and that the microtracks are read using an optical system associated to said magnetic head and comprising at least a polarized light source, a magneto-optical transducer and a linear optical sensor.

9. A tape recorder and/or playback device according to claim 1 characterized in that said means for supporting and said pressure means are the same means.

10. A tape recorder and/or playback device according to claim 9, characterized in that said pressure means comprises a pressure pad which is made of an elastic medium and a surface of which is used to press on said back side surface of the tape.

11. A tape recorder and/or playback device according to claim 9, characterized in that said pressure means comprises a pressure roller which is made of an elastic medium and is mounted on an axis perpendicular to the direction of the microtracks, a surface of the pressure roller being used to press on the back side surface of the tape.

12. A tape recorder and/or a playback device according to claim 1 characterized in that said means for supporting is located on the front side surface of the tape, is mounted around the magnetic head and has the same movement as the magnetic head when the magnetic head is displaced in said direction secant to the direction of the microtracks.

13. A tape recorder and/or playback device according to claim 12, characterized in that said pressure means comprises a pressure pad which is made of an elastic medium and a surface of which is used to press on said back side surface of the tape.

14. A tape recorder and/or playback device according to claim 12, characterized in that said pressure means comprises a pressure roller which is made of an elastic medium and is mounted on an axis perpendicular to the direction of the microtracks, a surface of the pressure roller being used to press on the back side surface of the tape.

15. A tape recorder and/or playback device according to claim 1 characterized in that said means for supporting comprise a plate which is located on the front side surface of the tape, said plate having a slanting opening in a direction secant to the direction of the microtracks in which the magnetic head can slide to address different macrotracks, said pressure means being mounted on a displacing means which allows said pressure means to be displaced in a way to assure said contact between the microtracks and the active parts when the magnetic head is moved.

16. A tape recorder and/or playback device according to claim 15, characterized in that said pressure means comprises a pressure pad which is made of an elastic medium and a surface of which is used to press on said back side surface of the tape.

17. A tape recorder and/or playback device according to claim 15, characterized in that said pressure means comprises a pressure roller which is made of an elastic medium and is mounted on an axis perpendicular to the direction of the microtracks, a surface of the pressure roller being used to press on the back side surface of the tape.

18. A tape recorder and/or playback device according to claim 1 characterized in that said pressure means comprises a pressure pad which is made of an elastic medium and a surface of which is used to press on said back side surface of the tape.

19. A tape recorder and/or playback device according to claim 1 characterized in that said pressure means comprises a pressure roller which is made of an elastic medium and is mounted on an axis perpendicular to the direction of the microtracks, a surface of the pressure roller being used to press on the back side surface of the tape.

20. A tape recorder and/or playback device according to claim 1 characterized in that said active parts of the magnetic head are used for writing only and that the microtracks are read using an optical system associated to said magnetic head and comprising at least a polarized light source, a magneto-optical transducer and a linear optical sensor.

\* \* \* \* \*